United States Patent [19]

Grego, Jr.

[11] 4,299,020

[45] Nov. 10, 1981

[54] FLYWHEEL PULLER

[76] Inventor: Joseph F. Grego, Jr., 709 Ogletown Rd., Newark, Del. 19711

[21] Appl. No.: 134,176

[22] Filed: Mar. 26, 1980

[51] Int. Cl.[3] .............................................. B23P 19/04

[52] U.S. Cl. ...................................................... 29/259

[58] Field of Search ................. 29/256, 258, 259, 264, 29/266; 248/300

[56] References Cited

U.S. PATENT DOCUMENTS

| | | | |
|---|---|---|---|
| 1,227,457 | 5/1917 | Langan | 29/259 |
| 2,884,670 | 5/1959 | Garrison et al. | 248/300 X |

FOREIGN PATENT DOCUMENTS

| | | | |
|---|---|---|---|
| 1220119 | 5/1960 | France | 248/300 |
| 286569 | 3/1928 | United Kingdom | 29/259 |
| 1404002 | 8/1975 | United Kingdom | 29/258 |

*Primary Examiner*—Robert C. Watson
*Attorney, Agent, or Firm*—Connolly & Hutz

[57] ABSTRACT

A flywheel puller includes a pair of planar surfaces disposed at an angle to each other with each surface having a center hole and at least one set of holes concentrically arranged around each center hole to accommodate threaded members for use in engaging and removing a flywheel from the crankshaft of an engine whereby the same puller may be used for different types of engines in accordance with the planar section being utilized.

16 Claims, 14 Drawing Figures

FLYWHEEL PULLER

BACKGROUND OF INVENTION

A large number of different types of engines exist which include flywheels mounted on the crankshaft. Various pullers are known to facilitate removing the flywheel. In general, however, a special puller having its own design is required not only for each manufacturer but also for each size engine of that manufacturer. A repair shop having numerous types of motors from different manufacturers and of different sizes accordingly requires a corresponding number of flywheel pullers. This not only presents storage problems but also cost problems resulting from the necessity of having so many different flywheel pullers. The general arrangement of conventional flywheel pullers is to provide a plate having threaded members such as self-tapping screws mounted to the puller for engaging the flywheel. Where the engine has a smooth crankshaft such as a Briggs & Stratton engine the crankshaft may extend through an opening in the puller until it rests on the threads and the puller is manipulated to remove the flywheel. On other pullers, a threaded core member extending through the puller is manipulated to remove the flywheel.

SUMMARY OF INVENTION

An object of this invention is to provide a universal flywheel puller which is not limited to use for any particular size engine or any particular manufacturer.

A further object of this invention is to provide such a flywheel puller which is relatively inexpensive and easy to manufacture.

In accordance with this invention, the universal type flywheel puller includes a pair of plate-like sections disposed at an angle to each other. Each section includes a center hole and at least one set of concentric holes so that threaded members may be accommodated and manipulated to remove a flywheel with the particular plate section being used being selected in accordance with the specific brand and size engine.

In an advantageous form of this invention, each plate section includes at least two sets of concentric holes so that a single puller could accommodate a total of four different type engines.

In accordance with a further practice of this invention the center hole in one of the plates may be threaded while the center hole in the other plate may be smooth.

THE DRAWINGS

DETAILED DESCRIPTION

Figure 2:
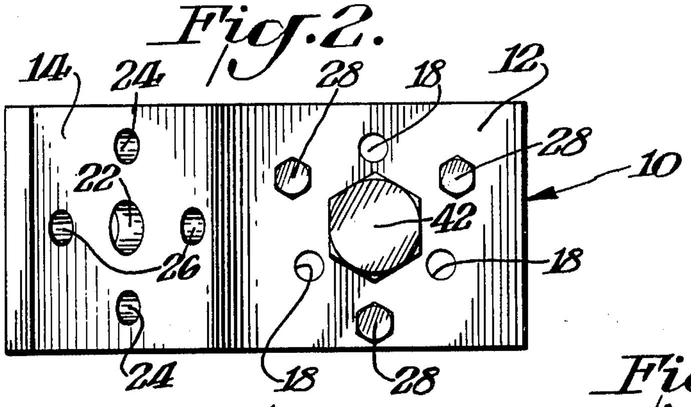
FIG. 2 is a top plan view of the flywheel puller shown in FIG. 1.
Figure 4:
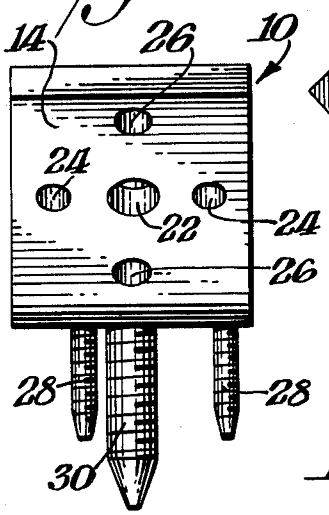
FIGS. 3–4 are front and rear elevation views of the flywheel puller shown in FIGS. 1–2.
Figure 1:
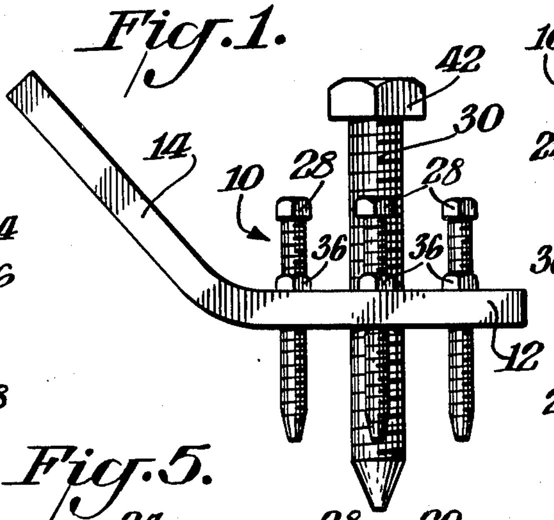
FIG. 1 is a side elevation view of a flywheel puller in accordance with this invention.
Figure 3:
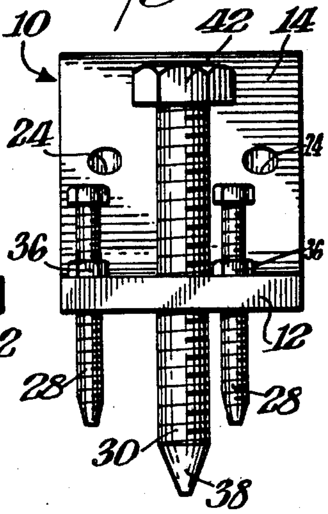
Figure 5:
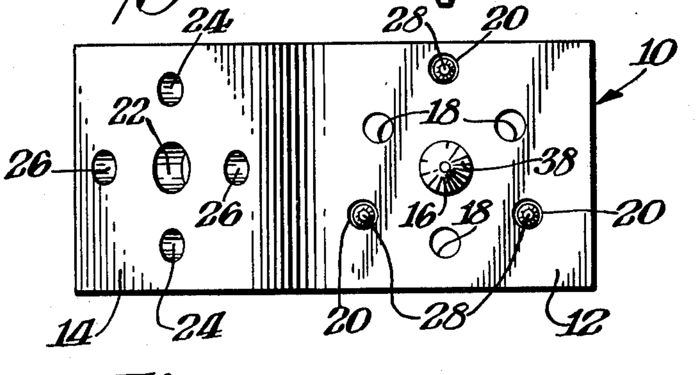
FIG. 5 is a bottom plan view of the flywheel puller shown in FIGS. 1–4.
Figure 6:
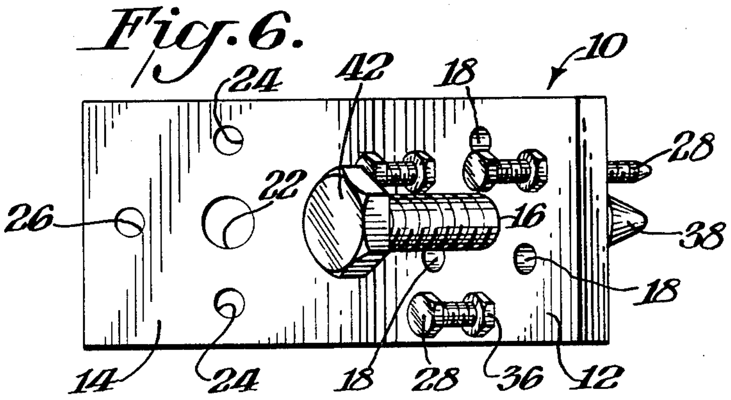
FIG. 6 is a top plan view of the flywheel puller shown in FIGS. 1–5 looking in a direction perpendicular to the inclined plate section.

FIGS. 1–6 show a flywheel puller 10 in accordance with this invention which is particularly adapted to be used for removing the flywheels of engines from two different manufacturers as well as two different size engines from each manufacturer. In other words, puller 10 may be utilized with four different types of engines. More specifically, flywheel puller 10, as illustrated, is adapted to remove a Briggs & Stratton flywheel as well as a Tecumseh flywheel. It should be appreciated, however, that the engines of these manufacturers are referred to solely for illustrative purposes and the invention in its broadest aspect is not intended to be limited to engines of those manufacturers or to any particular size engine.

As illustrated therein, flywheel puller 10 includes a first plate section 12 and a second plate section 14 inclined thereto. Plate section 12 has a central bore or opening 16. A first set of three holes 18, 18, 18 is arranged concentrically around central opening 16 with a second set of three holes 20, 20, 20 likewise arranged concentrically around central bore 16 but along a different arc. Similarly plate section 14 includes a central bore 22 having a first set of two holes 24, 24 arranged concentrically therearound with a second set of two holes 26, 26 arranged concentrically to central bore 22 but along a different arc than holes 24, 24.

In accordance with this invention, a plurality of threaded members are provided for engagement with a flywheel. FIGS. 1–8, for example, show the threaded members to comprise a set of three bolts 28, 28, 28 disposed through bores 20, 20, 20 with a center bolt 30 disposed through center bore 16.

Figure 7:
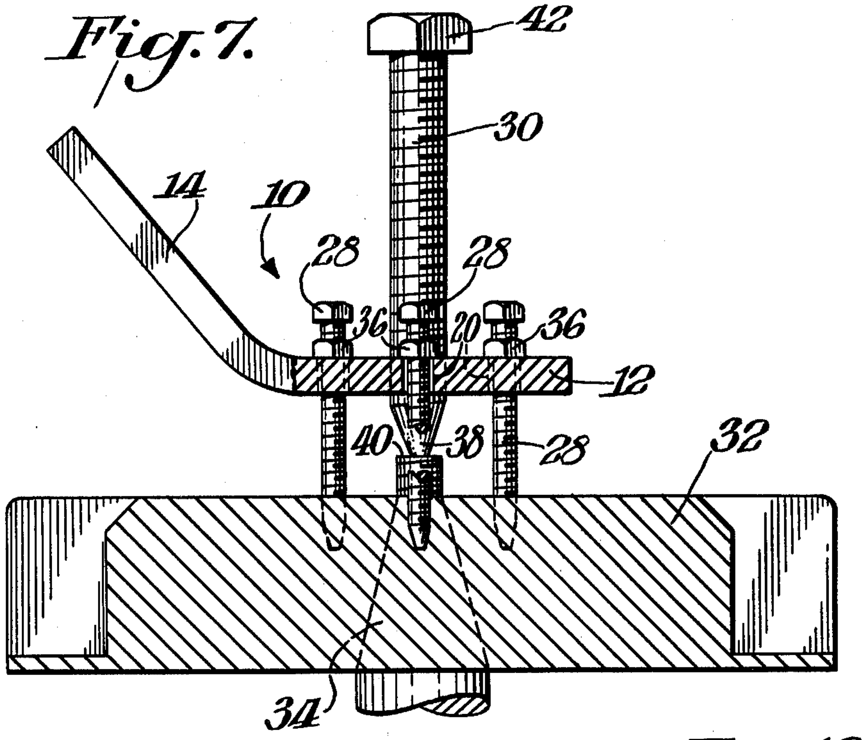
FIG. 7 is an elevation view partly in section showing the flywheel puller of FIGS. 1–6 in one phase of operation.
Figure 8:
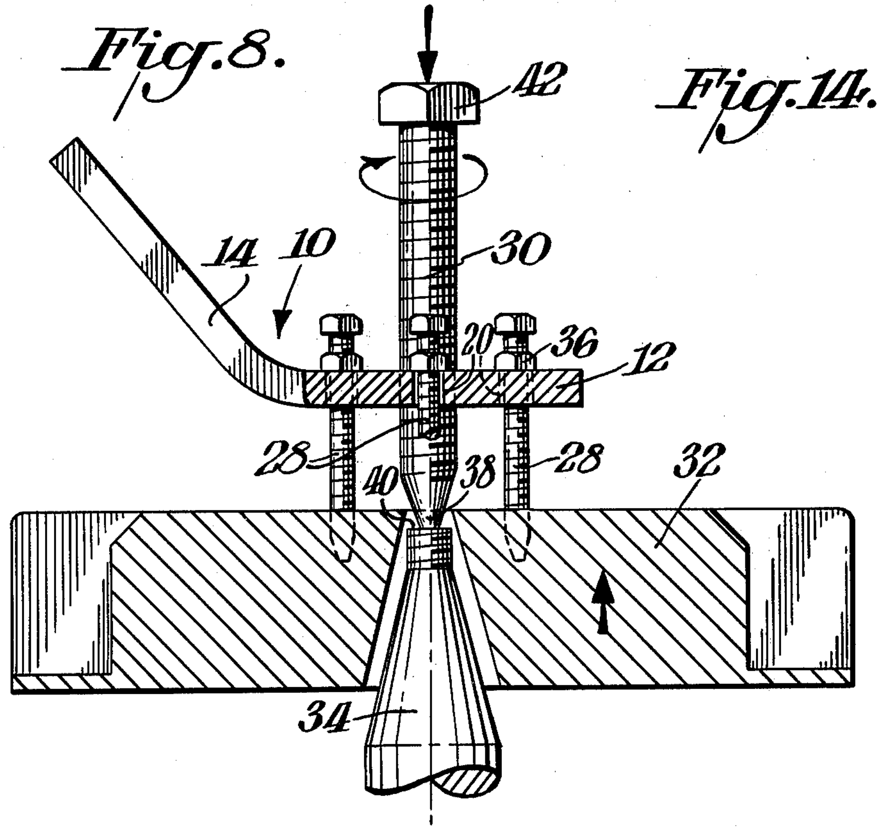
FIG. 8 is a view similar to FIG. 7 in a different phase of operation.

FIGS. 7–8 show the utilization of flywheel puller 10 in the form illustrated in FIGS. 1–6 for removing a flywheel 32 from a Tecumseh engine. The selection of holes 20, 20, 20 instead of holes 18, 18, 18 would depend on the particular size engine. For example, one set of holes could be used on either horizontal or vertical two-cycle Tecumseh engines while the other set could be used on larger engines such as four-horse power engines. The arrangement of the holes in plate section 12 is accordingly selected so as to correspond to the arrangement of corresponding threaded openings in the flywheel 32 of the Tecumseh engine. Such an engine, as illustrated in FIGS. 7–8, includes a crank shaft 34. In operation, concentrically arranged bolts 28, 28, 28 may be, for example, of a self-tapping type and are manipulated to engage corresponding holes in the flywheel 32. When bolts 28, 28, 28 have been properly engaged with plate section 12 being horizontal, nuts 36, 36, 36 on each bolt are manipulated to provide a plane of contact with the upper surface of plate section 12 as close as possible to the flywheel. Center bolt 30 is then manipulated so that its lower end 38 rests against the exposed surface 40 of crankshaft 34. The manipulation of center bolt 30 may be had in a conventional manner by means of its hexagonal head 42. Continued rotation of center bolt 30 causes the flywheel 32 to lift away from crankshaft 34 as illustrated in FIG. 8. This lifting results from bolts 28, 28, 28 being threadedly engaged to flywheel 32 and to plate section 12 so that the distance between flywheel 32 and plate section 12 is fixed. In the meantime, rotation of center bolt 30 causes its lower end 38 to tighten or press against exposed surface 40 of crankshaft 34 so as to increase the distance between plate section 12 and crankshaft 34 which in turn causes the flywheel 32 to be pulled away from crankshaft 34.

For a different size Tecumseh engine having a different arrangement in the flywheel, the same procedure would be used except that bolts 28, 28, 28 would be engaged in holes 18, 18, 18.

In the embodiment illustrated in FIGS. 1–8, bolts 28, 28, 28 are, for example, 2½ inches long with a 7/16 inch long hexagonal head and are ¼ inch in diameter with a 20 thread. Center bolt 30 is, for example, 4 inches long with 13/16 inch head and 9/16 inch diameter with 18 thread. As previously indicated, bolts 28, 28, 28 are preferably self-tapping although such self-tapping bolts are not essential for carrying out the concepts of this invention. Puller 10 is 6 inches long and 2½ inches wide with the set of holes 18 being located along an arc having a ¾ inch radius while holes 20, 20, 20 along an arc have a 1 inch thickness. Puller 10 is ⅜ inch thick. Center hole 16 would have a threaded surface corresponding to the diameter of center bolt 34. Holes 24, 24 in plate section 14 are located along an arc having a radius of ¾ inch while holes 26, 26 are along an arc having a radius of 1 inch. Plate section 14 is offset from the horizontal by an angle of 50° or, in other words, is at a angle of 130° with respect to plate section 12. Such angle may, for example, vary ±10°. Holes 18, 20, 24 and 26 would be large enough to provide sufficient clearance for bolts 28.

Figure 9:
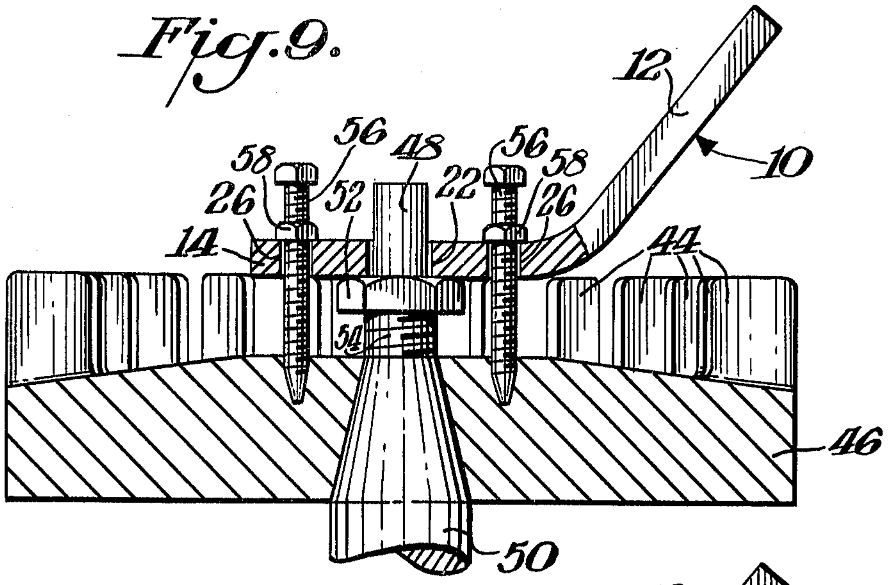
FIG. 9 is a side elevation view partly in section showing utilization of a different section of the flywheel puller of FIGS. 1–8.
Figure 10:
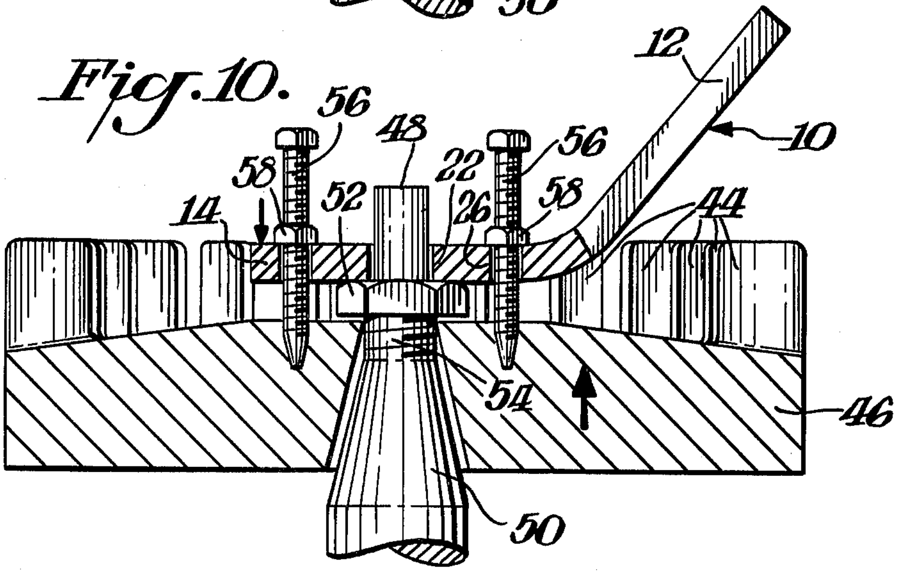
FIG. 10 is a view similar to FIG. 9 in a different phase of operation.

FIGS. 9–10 illustrate the use of puller 10 when plate section 14 is operative. As indicated in FIGS. 9–10, this embodiment is for illustrative purposes utilized for pulling a flywheel from a Briggs & Stratton engine. One set of holes may be utilized for Briggs & Stratton models through 130000 and the alternate set of holes would be used for models 140000, 170000 and 190000. FIGS. 9–10 illustrate the importance of having plate sections 12 and 14 offset from each other. In this respect, if the plate sections were not offset, it would not be possible to utilize the same puller for both types of engines since the fins 44 of flywheel 46 would otherwise obstruct the placement of a flat puller having two separate sections for two engines. In the embodiment illustrated in FIGS. 9–10 with the Briggs & Stratton engine, puller 10 is positioned so that the smooth end 48 of crankshaft 50 may extend through oversize smooth center bore 22. Before placing puller 10 on crankshaft 50, however, a nut 52 is engaged with the threaded portion 54 of crankshaft 50. The nut acts as a stop for the lower surface of plate section 14 as well as a support therefor. Threaded members or bolts 56, 56 are then inserted through a suitable pair of smooth openings 24, 24 or 26, 26 and engage corresponding openings in flywheel 46. Bolts 56, 56 may be self-tapping as previously described. Nuts 58, 58 on bolts 56, 56 are then tightened one at a time against the upper surface of plate section 14. This would tend to push plate section 14 downwardly. The downward movement, however, is prevented by bolt 52. Accordingly if nuts 58 are moved downwardly around their bolts 56 the result is to lift the flywheel upwardly away from crankshaft 50. When the flywheel has been sufficiently raised, inclined section 12 may be used as a handle to assist in the lifting operation. Nut 52 is removed after the flywheel 46 has been effectively pulled away from the crank shaft 50.

Figure 11:
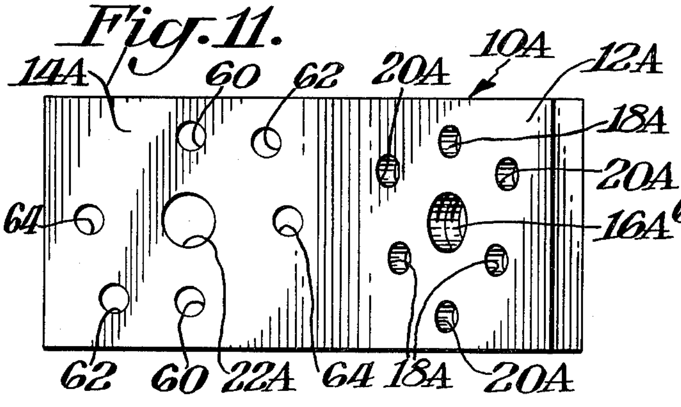
FIG. 11 is a top plan view of a modified form of flywheel puller.

The invention has been particularly described with respect to Tecumseh and Briggs & Stratton engines. As previously indicated, however, it is possible to practice the invention with other types of engines and with engines from more than two different manufacturers. FIG. 11, for example, shows a puller 10A wherein plate section 14A includes one set of holes 60, 60 around a concentric arc for one type of engine with a second concentric set of holes 62, 62 for a second type of engine and a third set of holes 64, 64 for a third type of engine.

Figure 12:
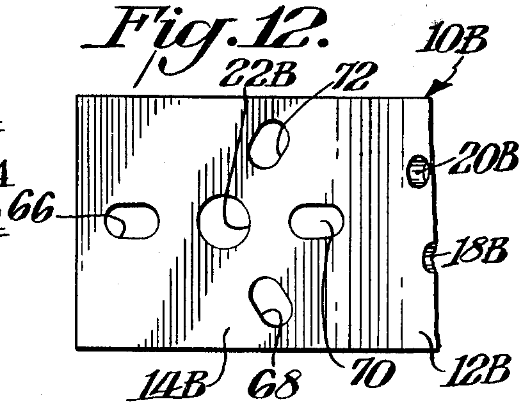
FIG. 12 is a top plan view of a portion of yet another modified form of flywheel puller.

The same effect achieved in FIG. 11 may also be attained with puller 10B of FIG. 12 wherein instead of utilizing more than two sets of circular holes in plate section 14A, plate section 14B of FIG. 12 includes sets of elongated or slot-like holes 66, 68, 70, 72. Holes or slots 66, 70 may, for example, work as a single set for two-bolt arrangements while holes 66, 68 and 72 may function as a single set for three-bolt arrangements with the elongated slots permitting a variation in the positioning of the bolts.

Figure 13:
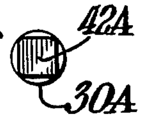
FIGS. 13–14 are top and side views of a modified form of center bolt usable in the flywheel pullers of FIGS. 1–12.
Figure 14:
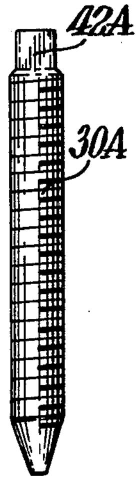

Although the various bolts shown in the embodiment of FIGS. 1–10 are illustrated as having hexagonal heads, other heads may be utilized such as illustrated in FIGS. 13–14 wherein the center bolt 30A has a recessed square head 42A.

As previously described, the invention may be practiced with various modifications within the spirit of the teachings herein. In general, however, the invention involves providing a universal type flywheel puller wherein the same puller is capable of effectively being utilized on more than one engine with the use of minimal parts and without necessitating a complicated pulling procedure.

The provision of nuts on bolts 28 serves multiple advantages. In addition to being utilized during the flywheel pulling operation, the nuts also function to keep the threads clean by periodically manipulating the nuts up and down the bolts. Additionally during period of non-use, or storage, the nuts may be secured to the bolts below puller 10 to prevent the bolts from being lost since the corresponding holes in puller 10 are slightly oversize. Similarly the provision of a pair of offset angularly arranged plate sections has the advantage of permitting one section to be used as a handle while the other section operates to pull the flywheel.

What is claimed is:

1. A puller for flywheels and the like removably attached to an engine having a crankshaft, said puller comprising a first planar plate section, a second planar plate section attached to and extending away from said first plate section at an obtuse angle thereto whereby said plate sections are in different planes, crankshaft manipulating means on said first plate section for facilitating the manipulation of the crankshaft relative to the flywheel for imparting relative linear movement between the crankshaft and the flywheel, said crankshaft manipulating means including a center bore extending completely through said first plate section for being selectively disposed in line with the crankshaft, flywheel engaging means on said first plate section for selectively detachably mounting said first plate section to the flywheel, said first plate section flywheel engaging means including at least one set of coarcuate holes extending completely through said first plate section concentrically around said first plate section center bore for alignment with a corresponding set of holes in the flywheel whereby mounting members may be selectively inserted through said holes in said first plate section and engaged in the corresponding flywheel holes, said first plate section center bore having a larger diameter than the diameter of said first plate section holes, crankshaft manipulating means on said second plate section for facilitating the manipulation of the crankshaft relative to the flywheel for imparting relative movement between the crankshaft and the flywheel, said crankshaft manipulating means including a center bore extending completely through said second plate section for being selectively disposed in line with the crankshaft, flywheel engaging means on said second plate section for selectively mounting said second plate section to the flywheel, said second plate section flywheel engaging means including at least one set of coarcuate holes extending completely through said second plate section concentrically arranged around said second plate section center bore for alignment with a corresponding set of holes in the flywheel whereby mounting members may be selectively inserted through said holes in said second plate section and engaged in the corresponding flywheel holes, and said second plate section center bore having a larger diameter than the diameter of said second plate section holes.

2. The puller of claim 1, in combination therewith, a flywheel attached to an engine having a crankshaft, said first plate section center bore being threaded, a center bolt threadedly engaged in said threaded center bore and disposed in contact with said crankshaft, said mounting members being bolts extending through said first plate section holes and threadedly engaged in holes in said flywheel.

3. The puller of claim 1, in combination therewith, a flywheel attached to an engine having a crankshaft, the outer end of said crankshaft being of smooth outer surface, said crankshaft having a threaded portion adjacent said smooth portion, a nut engaged on said threaded portion of said crankshaft, said smooth portion of said crankshaft extending through said second plate section bore, said second plate section being disposed against said nut, and said mounting members being bolts extending through said second plate section holes and threadedly engaged in holes in said flywheel.

4. The puller of claim 1 wherein said set of holes in at least one of said plate sections is in the form of slots.

5. The puller of claim 1 wherein said first plate section center bore is threaded.

6. The puller of claim 5 wherein at least one of said plate sections has a plurality of sets of said coarcuate holes.

7. The puller of claim 6 wherein said second plate section center bore is smooth.

8. The puller of claim 7 wherein each of said plate sections has a plurality of sets of coarcuate holes.

9. The puller of claim 8 including a bolt extending through each hole in one of said sets of coarcuate holes to comprise said mounting members, and a nut on each of said bolts between the head of its bolt and its plate section.

10. The puller of claim 9 including a center bolt threadably engaged with said threaded center bore.

11. The puller of claim 10 wherein said plate sections are at an angle of about 130 degrees with respect to each other.

12. The puller of claim 10 wherein each of said sets of holes in said first plate section comprises three holes, and each of said sets of holes in said second plate section comprising two holes.

13. The puller of claim 1 wherein at least one of said plate sections has a plurality of sets of said coarcuate holes.

14. The puller of claim 1 wherein each of said plate sections has a plurality of sets of coarcuate holes.

15. The puller of claim 1 including a bolt extending through each hole in one of said sets of coarcuate holes to comprise said mounting members, and a nut on each of said bolts between the head of its bolt and its plate section.

16. The puller of claim 10 wherein said plate sections are at an angle in the range of 120 to 140 degrees with respect to each other.

* * * * *